(12) United States Patent
Bak (10) Patent No.: US 9,436,585 B1
(45) Date of Patent: Sep. 6, 2016

(54) IMAGE PATCHING IN AN INTEGRATED DEVELOPMENT ENVIRONMENT

(71) Applicant: International Business Machines Corporation, Armonk, NY (US)

(72) Inventor: Nathan V. Bak, Portland, OR (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/946,134

(22) Filed: Nov. 19, 2015

(51) Int. Cl.
  *G06F 9/44* (2006.01)
  *G06F 11/36* (2006.01)
  *G06F 3/0488* (2013.01)

(52) U.S. Cl.
  CPC ......... *G06F 11/3664* (2013.01); *G06F 3/0488* (2013.01); *G06F 8/71* (2013.01)

(58) Field of Classification Search
  CPC ..... G06F 11/3664; G06F 3/0488; G06F 8/71
  USPC .................................. 717/125, 110
  See application file for complete search history.

(56) References Cited

U.S. PATENT DOCUMENTS

| 7,484,203 | B2 | 1/2009 | Drake |
| 7,694,181 | B2 | 4/2010 | Noller et al. |
| 7,743,090 | B1 * | 6/2010 | Gibson ............... G06F 11/2294 709/201 |
| 8,245,192 | B1 * | 8/2012 | Chen ........................ G06F 8/30 717/103 |
| 2012/0089964 | A1 | 4/2012 | Sawano |
| 2013/0318498 | A1 | 11/2013 | Mittal et al. |
| 2014/0123110 | A1 | 5/2014 | Wan et al. |
| 2015/0007130 | A1 * | 1/2015 | McConville ............ G06F 3/017 717/106 |
| 2015/0082280 | A1 | 3/2015 | Betak et al. |

FOREIGN PATENT DOCUMENTS

JP   2015011661 A   1/2015

OTHER PUBLICATIONS

Anonymous: "An Efficient Method of Developing/Debugging JSP Pages of Web/Portal Application Using IDE"; IP.COM No. 000035502; Jan. 21, 2005; pp. 3.
Marc Guillemot; et al.: "Web Testing Made Easy"; OOPSLA; ACM 1-59593-491X/06/0010; Portland, Oregon; Oct. 22-26, 2006; pp. 2.

* cited by examiner

*Primary Examiner* — Anna Deng
(74) *Attorney, Agent, or Firm* — Cantor Colburn LLP; Scott Dobson (57) ABSTRACT

The disclosed herein related to image patching in an integrated development environment executed. To image patch, a first image produced by a latest build is pulled into the integrated development environment and a build snapshot produced by the latest build is acquired from the first image. A comparison is made between the build snapshot and contents of a current workspace of the integrated development environment to determine changed contents. A layer containing the changed contents is patched into the first image to generate a second image.

10 Claims, 5 Drawing Sheets

IMAGE PATCHING IN AN INTEGRATED DEVELOPMENT ENVIRONMENT

BACKGROUND

The present disclosure relates generally to image patching in an integrated development environment.

In contemporary implementations of large software projects with multiple components in a continuous integration scenario, it is difficult for developers to test changes to the overall code before delivery of any software projects. For example, developers often only have a small code piece of the overall code in an integrated development environment. Testing this small code piece and changes thereof requires downloading and configuring assorted additional code pieces. This type of testing is very error prone, along with being extremely time consuming. Thus, developers may generally choose to deliver untested code.

SUMMARY

Embodiments include a method, system, and computer program product for an image patching in an integrated development environment includes pulling a first image produced by a latest build into the integrated development environment; acquiring a build snapshot produced by the latest build from the first image; comparing the build snapshot with contents of a current workspace of the integrated development environment to determine changed contents; and patching a layer containing the changed contents into the first image to generate a second image.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter described herein is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

It is understood in advance that although this disclosure includes a detailed description on cloud computing, implementation of the teachings recited herein are not limited to a cloud computing environment. Rather, embodiments herein are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
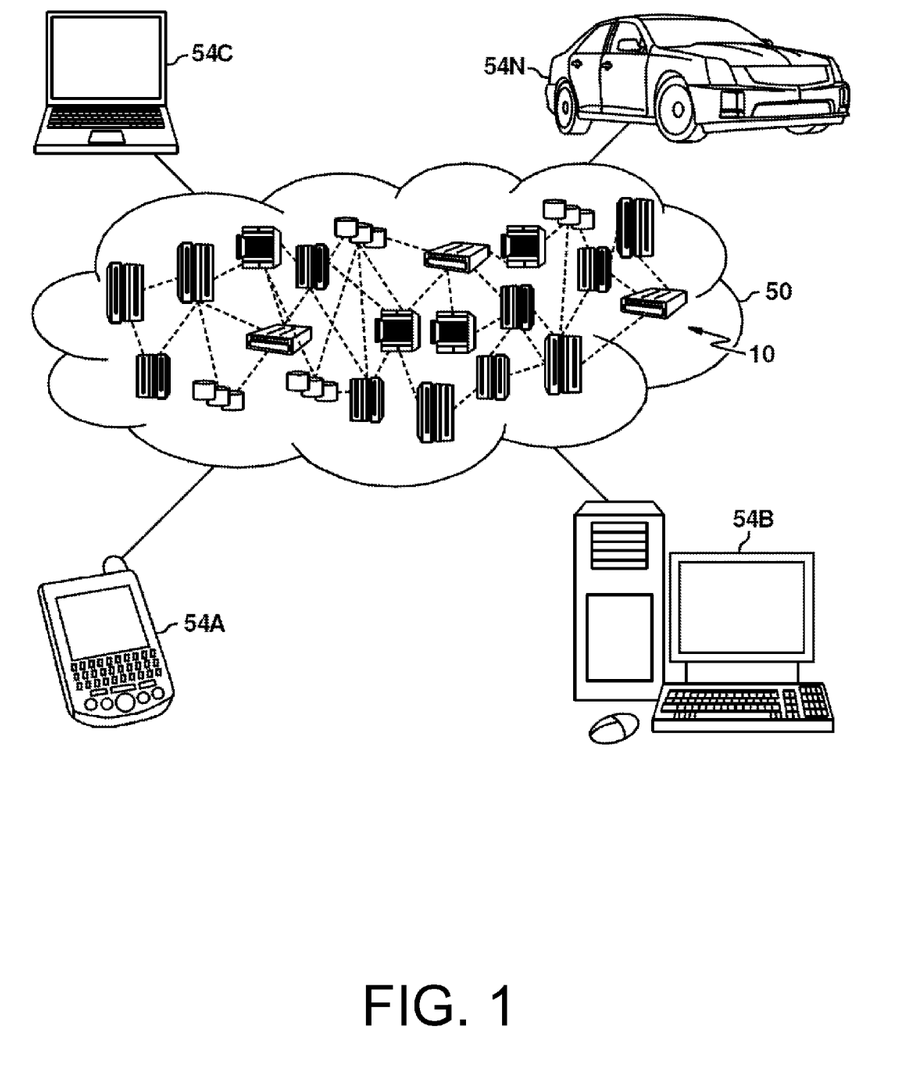
FIG. 1 depicts a cloud computing environment according to an embodiment.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
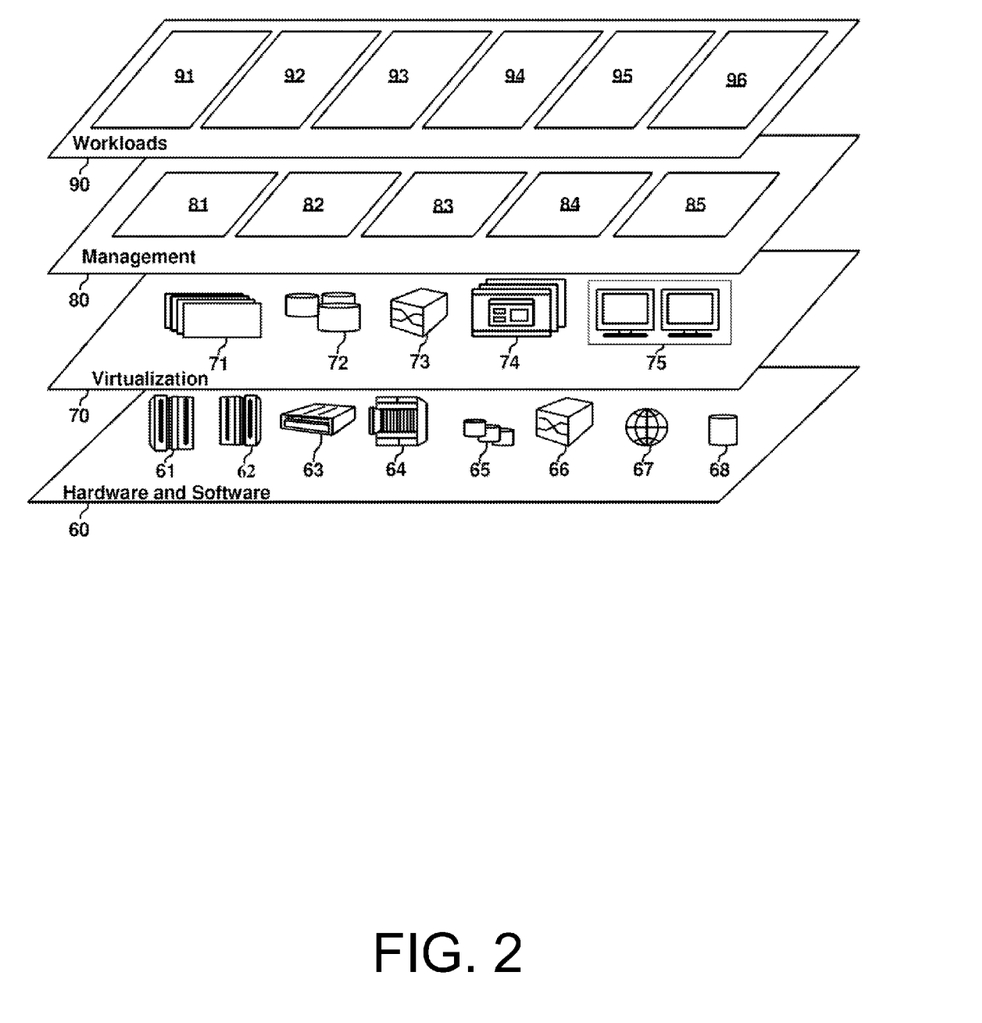
FIG. 2 depicts abstraction model layers according to an embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments herein are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and main idea 96.

Figure 3:
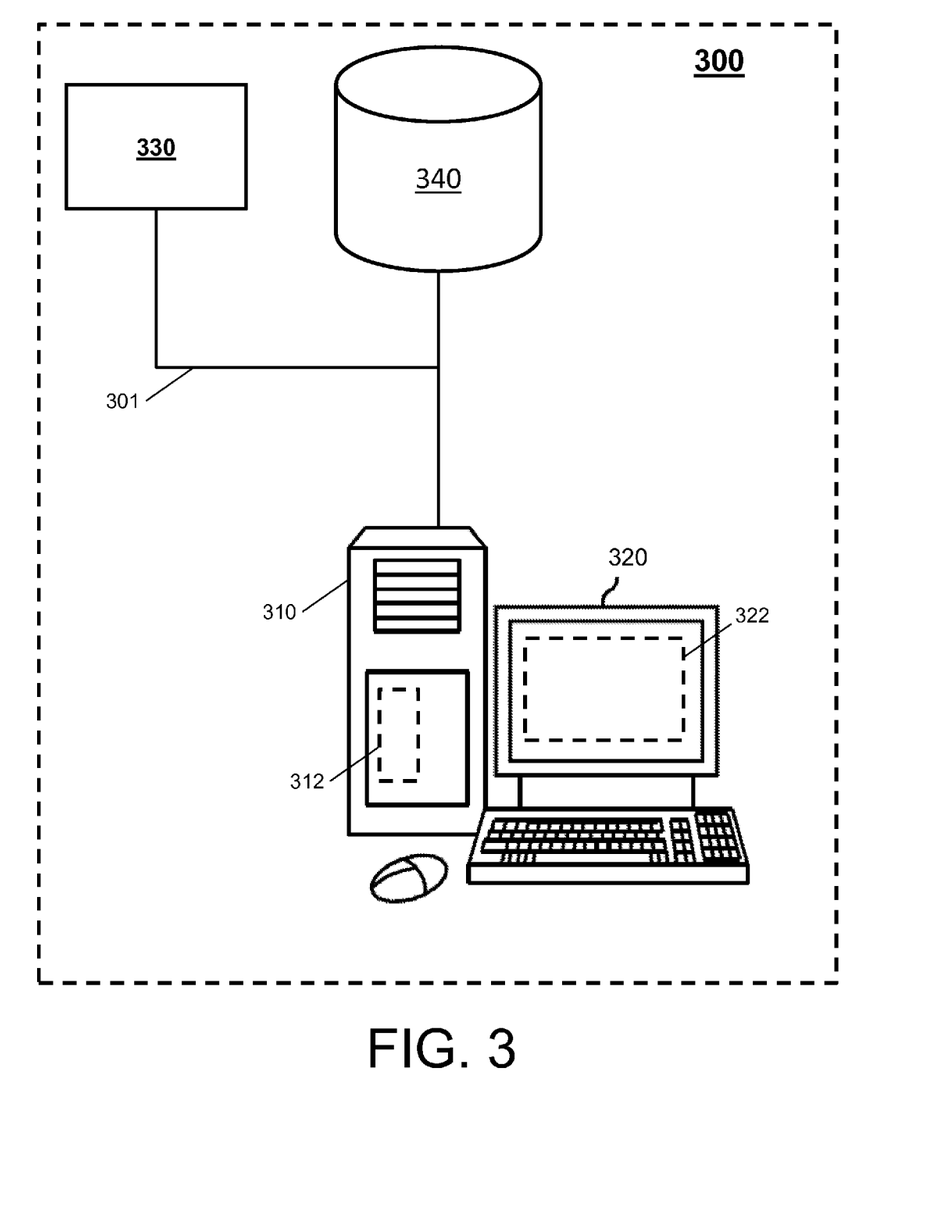
FIG. 3 depicts an integrated development environment in accordance with an embodiment.

In view of the above, embodiments described herein relate to image patching in an integrated development environment to enable timely, error free testing of code pieces. Turning now to FIG. 3, a system 300 is generally shown in accordance with an embodiment. The integrated development environment 300 includes a computer 310 running an integrated development environment 312, a display 320 presenting an interface 233, a registry 330, and a storage facility 340. The system and components therein utilize connections 301 to communicate.

The computer 310 can be a computer processor, one of the computing devices 54A-N, one of the computing nodes 10, etc. as described herein. The computer 310 executes the integrated development environment 312.

The integrated development environment 312 can deploy applications (e.g. the product builds) inside software containers by providing an additional layer of abstraction and automation of operating-system-level virtualization. The integrated development environment 312 can implement a high-level application programmable interface to provide these software containers that run processes in isolation. The software containers do not require or include a separate operating system; rather, the software containers rely on resource isolation (e.g., processor, memory, block I/O, network, etc.) and separate namespaces to isolate the application's view of the operating system. The integrated development environment 312 can create and manage containers to simplify the creation of highly distributed systems, by allowing multiple applications, worker tasks and other processes to run autonomously on a single physical machine (e.g., computer 310) or across multiple virtual machines (e.g., allows the deployment of nodes to be performed as resources become available or when more nodes are needed, allowing a PAAS-style of deployment and scaling). Thus, by using containers, the integrated development environment 312 can isolate resources, restrict services, and process provisions to provide a private view of the operating system of the computer 310 with a corresponding process space, file system structure, and network interfaces.

The display device 320 is an output device for presentation of information in visual or tactile form. The display device 320 is configured to display the interface 322. The interface can present a mechanism for receive a gesture, as further described below.

The registry 330 can be a computing device configured as a central location in the system where product builds, images, containers, and metadata definitions are stored maintained, and shared. For example, the registry 330 can facilitate image portability where a state of any container can be committed as an image and shared through the registry.

The storage facility 340 can be a computing device configured to organize and collection of data, such as schemes, tables, queries, reports, views and other objects.

In an example operation of the system 300, a source code can be received by the integrated development environment 312, which in turn can compile or package the source code into a file. Further, the integrated development environment 312 can also utilize containers to output an image, instead of outputting a file, that can be used to create a subsequent container (e.g., embodiments herein can produce an image from product builds as one of a plurality of build outputs).

When a defect is found during these operations, a user/developer may want to test a code (or a fix). With containers and images, the integrated development environment 312 can provide the developer the ability to make a gesture within the interface 322 to automatically install a build into the integrated development environment 312, patch the code (add files and/or turn on debugging) into the build, and run the product normally to test the code.

Figure 4:
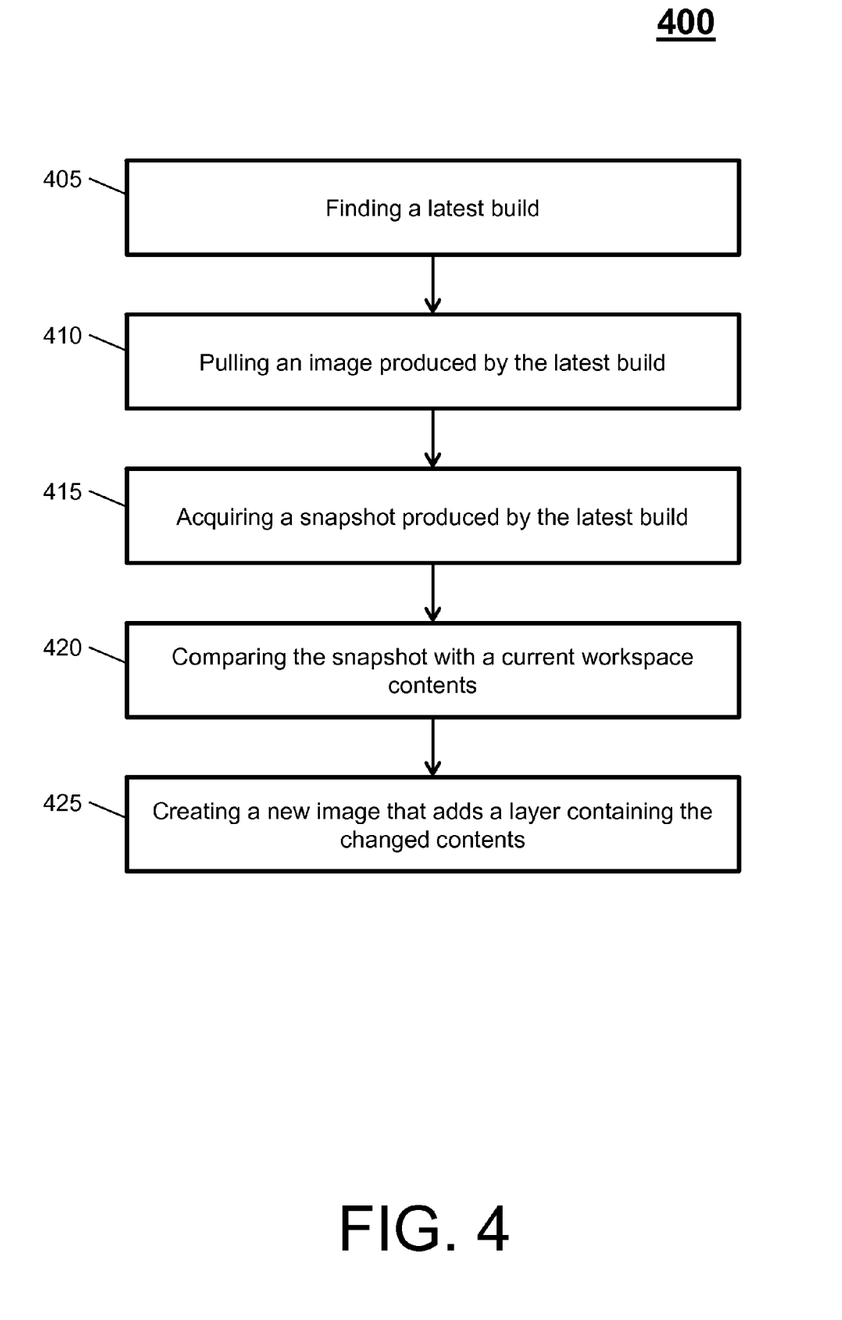
FIG. 4 depicts a process flow of an integrated development environment in accordance with an embodiment.

Turning now to FIG. 4, a process flow 400 of the integrated development environment 312 is depicted in accordance with an embodiment. When the developer wants to test changes, a gesture is performed within the interface 322 and the integrated development environment 312 performs the process flow 400 (e.g., the gesture automatically triggers the pulling, the acquiring, the comparing and the patching described below). The gesture is a selection of a feature within the integrated development environment based on a user input. The gesture can be a single click or selection of a button within the interface 322. If there is only one build and one source, the process flow 400 can proceed to block 405 without further action. If a plurality of contents within a current workspace or interface 322 of the integrated development environment 312 are present, a receiving of the gesture can causes a prompt or sub-interface to be presented by the interface 322. The sub-interface can receive input that designates a build within the plurality of contents to compare to a build snapshot. A build snapshot is associated with a build so that a developer can identify a version of artifacts that were used by the particular. An example of a build snapshot is a software configuration management snapshot.

At block 405, the integrated development environment 312 finds a latest build. At block 410, the integrated development environment 312 pulls an image produced by the latest build. Utilizing a latest and greatest package avoids local processing and/or compilation of code or the like. Further, certainty is provided as to whether a target environment is the same, because the integrated development environment 312 pulls exactly what the build is producing. Also, because the pull is into the integrated development environment 312, the integrated development environment 312 can know what source was included in that build that was just pulled down (along with run a comparison of what is different in the developers workspace as seen in block 420).

At block 415, the integrated development environment 312 acquires a snapshot produced by the latest build. At block 420, the integrated development environment 312 compares the build snapshot with the current workspace contents (e.g., compares the build snapshot with contents of a current workspace of the integrated development environment to determine changed contents).

At block 425, the integrated development environment 312 creates a new image that adds a layer containing the changed contents. That, the integrated development environment 312 can generate a layered file system (instead of changing the existing image), which is a new image with an additional layer including the developers changed content.

Figure 5:
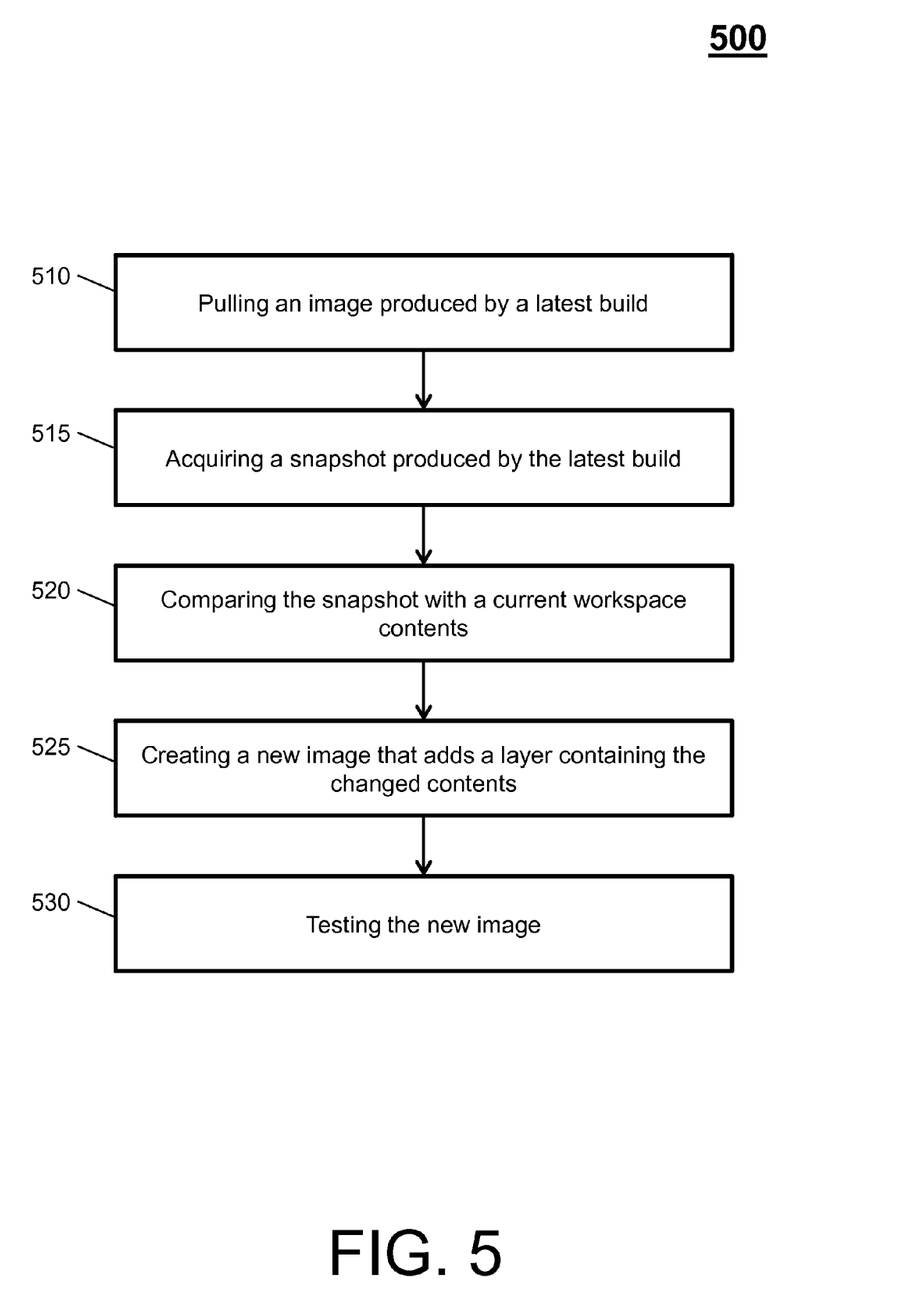
FIG. 5 depicts another process flow of an integrated development environment in accordance with an embodiment.

FIG. 5 depicts another process flow 500 of the integrated development environment 312 in accordance with an embodiment. The process flow 500 begins at block 510, where the integrated development environment 312 pulls an image produced by the latest build.

In an example embodiment, the integrated development environment 312 can be a software development team collaboration tool, such as Rational Team Concert, that utilizes automation software, such as Docker, for images and containers. Products of the software development team collaboration tool can be written in general purpose computer programming language. When the process flow 500 is invoked, the software development team collaboration tool first needs to find the latest build. If configured with the build definition name or identification, software development team collaboration tool has an application programmable interface that automates obtaining the build result from the latest, non-personal build. With the link to the automation software image, an automation software pull command could make a local copy of the automation software image.

At block 515, the integrated development environment 312 acquires a snapshot produced by the latest build. Continuing with the example embodiment, a software configuration snapshot is also attached to the build result.

At block 520, the integrated development environment 312 compares the build snapshot with the current workspace contents (e.g., compares the build snapshot with contents of a current workspace of the integrated development environment to determine changed contents). Continuing with the example embodiment, the software development team collaboration tool includes a capability to compare a workspace with a snapshot to determine the changed content.

At block 525, the integrated development environment 312 creates a new image that adds a layer containing the changed contents. Continuing with the example embodiment, once the changed content has been identified, the software development team collaboration tool creates a new image that contains the changed content. For example, the software development team collaboration tool can append additional instructions to the original automation software file and then run an automation software build command. Information about an automation software image and automation software file used to create the automation software image can be associated via the logs, external links, and/or downloads section of the build definition. Any instructions added can depend on the product. For example with respect to a Java product, a copy command can put changed class files into a directory and modify a classpath so that the directory is listed first. For example with respect to an Eclipse product, changed plug-ins can be copied into a dropins folder. For example with respect to a web application, changed classes can be added to an existing web application archive (overwriting the existing classes).

Once that new image is created, the integrated development environment 312 can run the new image and/or launched for testing (as seen in block 530). Also, the new image can be pushed by integrated development environment 312 to the registry 330 and/or storage facility 340 to do testing (e.g., push the new image to a registry 330 to cause remote testing of the new image by other developers). Continuing with the example embodiment, with the new image created, the developer can begin testing in as little time as is required to create a new container based on the image (usually a few seconds) and the invention could easily automatically create the new container. A caching mechanism of the automation software can be utilized so normally performance would not be an issue. In addition, the software development team collaboration tool can also run the automation software push command to post the new image to the registry 330 from which it could be fetched for manual or automated testing.

Technical effects and benefits of embodiments herein include a fast and easy creation of new images and containers to allow for testing; avoiding special knowledge of the image creation process by the user due to the gesture operation; providing automatic selection of builds and sources so that users are not required to know or manually determine what should be added; and enabling a portable image, functionality that can easily be tested locally or remotely. Thus, embodiments described herein are necessarily rooted in computer to perform proactive operations to overcome problems specifically arising in the realm of integrated development environments (e.g., these problems include the manual testing of code iterations, resulting in unwanted costs and expenses).

The embodiments herein may be a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of image patching in an integrated development environment executed by a processor coupled to a memory, comprising:
    receiving, by the processor, a gesture that automatically causes a prompt for receiving input within the integrated development environment when a plurality of contents are present within the current workspace, wherein the gesture is a selection of a feature within the integrated development environment based on a user input, and the gesture automatically triggers:
    pulling, by the processor, a first image produced by a latest build into the integrated development environment;
    acquiring, by the processor, a build snapshot produced by the latest build from the first image;
    comparing, by the processor, the build snapshot with the plurality of contents of the current workspace of the integrated development environment to determine changed contents, wherein a input caused by the gesture designates a build within the plurality of contents to compare to the build snapshot;
    patching, by the processor, a layer containing the changed contents into the first image to generate a second image; and
    pushing, by the processor, the second image to a registry to cause remote testing of the second image.

2. The method of claim 1, further comprising finding the latest build within the integrated development environment.

3. The method of claim 1, further comprising testing the second image in the integrated development environment.

4. The method of claim 1, wherein the feature is a button within an interface of the integrated development environment, wherein the selection of the feature is a single click or selection of the button, and wherein the user input causes the selection of the feature.

5. A computer program product, the computer program product comprising a computer readable storage medium having program instructions for image patching in an integrated development environment embodied therewith, the program instructions executable by a processor to cause the processor to perform:
    receiving, by the processor, a gesture that automatically causes a prompt for receiving input within the integrated development environment when a plurality of contents are present within the current workspace, wherein the gesture is a selection of a feature within the integrated development environment based on a user input, and the gesture automatically triggers:
    pulling a first image produced by a latest build into the integrated development environment;
    acquiring a build snapshot produced by the latest build from the first image;
    comparing the build snapshot with contents of a current workspace of the integrated development environment to determine changed contents, wherein a input caused by the gesture designates a build within the plurality of contents to compare to the build snapshot;
    patching a layer containing the changed contents into the first image to generate a second image; and
    pushing the second image to a registry to cause remote testing of the second image.

6. The computer program product of claim 5, the program instructions further causing the processor to perform finding the latest build within the integrated development environment.

7. The computer program product of claim 5, the program instructions further causing the processor to perform testing the second image in the integrated development environment.

8. A system for image patching in an integrated development environment executed, comprising:
    a memory having computer readable instructions; and
    a processor for executing the computer readable instructions, the computer readable instructions causing the system to perform:
    receiving, by the processor, a gesture that automatically causes a prompt for receiving input within the integrated development environment when a plurality of contents are present within the current workspace, wherein the gesture is a selection of a feature within the integrated development environment based on a user input, and the gesture automatically triggers:

pulling a first image produced by a latest build into the integrated development environment;

acquiring a build snapshot produced by the latest build from the first image;

comparing the build snapshot with contents of a current workspace of the integrated development environment to determine changed contents, wherein a input caused by the gesture designates a build within the plurality of contents to compare to the build snapshot;

patching a layer containing the changed contents into the first image to generate a second image: and pushing the second image to a registry to cause remote testing of the second image.

9. The system of claim 8, the computer readable instructions further causing the system to perform finding the latest build within the integrated development environment.

10. The system of claim 8, the computer readable instructions further causing the system to perform testing the second image in the integrated development environment.

* * * * *